Feb. 9, 1971 J. F. MAYER 3,561,861
SELF-CONTAINED PROJECTOR AND SCREEN UNIT
Filed Jan. 9, 1969 2 Sheets-Sheet 1

INVENTOR
John F. Mayer
BY Wood, Herron and Evans
ATTORNEYS

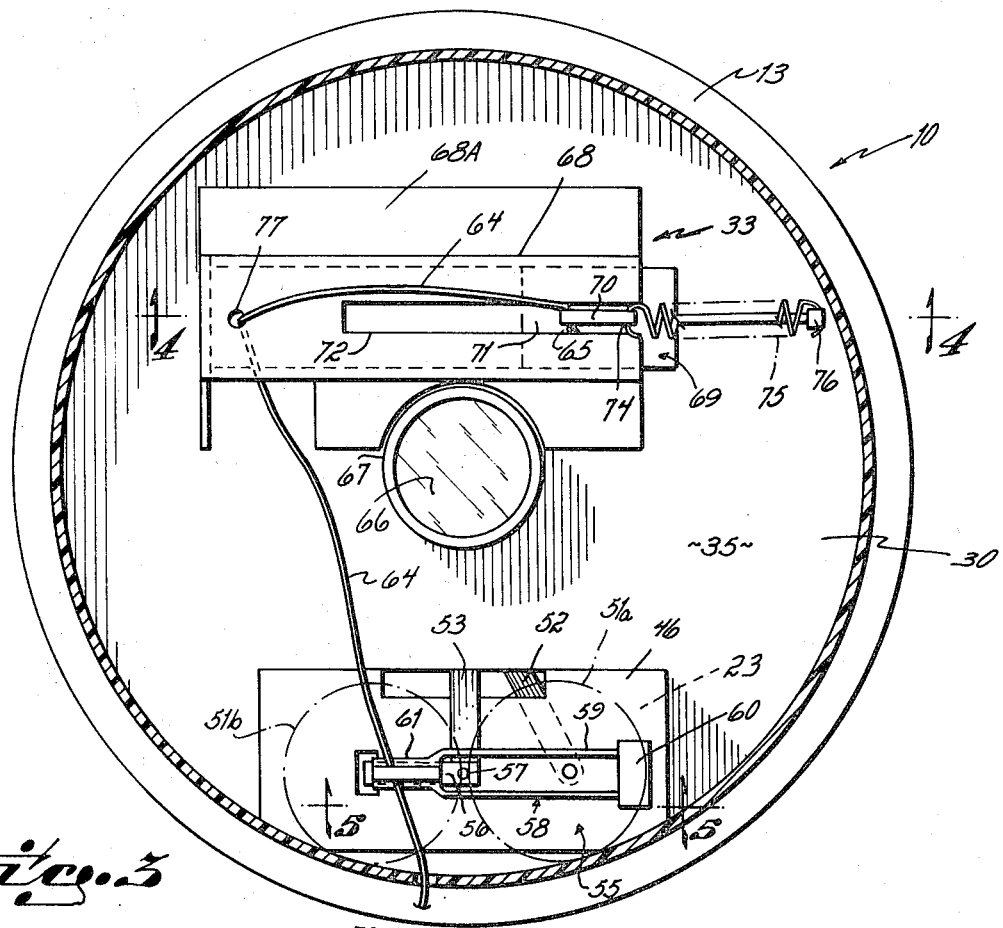
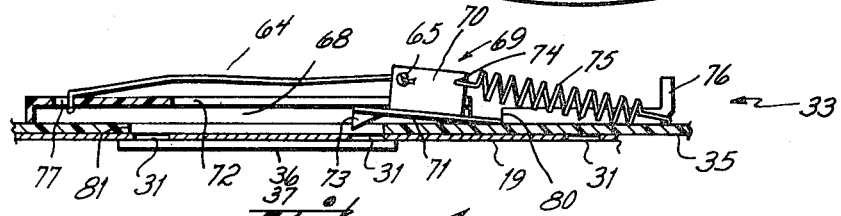
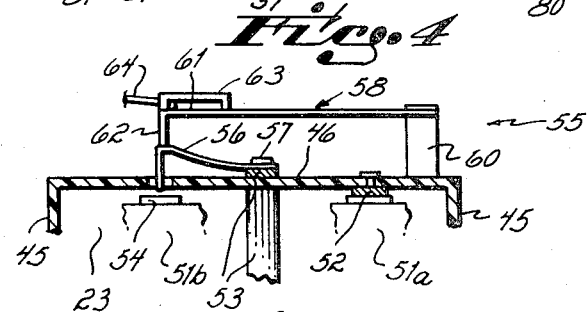

United States Patent Office 3,561,861
Patented Feb. 9, 1971

3,561,861
SELF-CONTAINED PROJECTOR
AND SCREEN UNIT
John F. Mayer, Fort Thomas, Ky., assignor to Kenner
Products Company, Cincinnati, Ohio, a corporation of
Delaware
Filed Jan. 9, 1969, Ser. No. 790,013
Int. Cl. G03b 1/48
U.S. Cl. 353—95                                   9 Claims

ABSTRACT OF THE DISCLOSURE

A self-contained projector and screen unit comprising, in preferred form, (a) a housing mounting a translucent screen on one side thereof, (b) a film strip having a series of image carrying frames enclosed within the housing, (c) a projection system, including a lens and a light source, positioned inside of the housing and adapted to project the film strip's frames onto the screen, (d) a switch for selectively actuating the light source, (e) frame sequencing apparatus for selectively moving film frames one at a time in sequence through the projection system, and (f) a pull cord relating the frame sequencing apparatus to the switch and extending outside of the housing. As the cord is repeatedly pulled by a child the film strip frames are sequentially presented one at a time to the projection system; also, the light source is turned on only when the cord is pulled. Thus, the unit operates to project a different image onto the screen from the film strip each time and only when the cord is pulled.

---

This invention relates to a self-contained projector and screen unit and more particularly relates to a self-contained projector and screen unit especially adapted for use in toys.

For children of an extremely young age, for example, less than about three years, the concepts employed in the toys available have been quite limited in scope. Historically a child in this age group has been provided with dolls, balls, push toys, pull toys, and the like. Nonetheless, it is well recognized that even at such a young age it is desirable for children to be exposed to very basic logic concepts. Thus, it has been one objective of this invention to provide a self-contained projector and screen unit that teaches the logic concept of cause and effect. In the self-contained projector and screen unit of this invention a child sees the effect of an image projected onto the screen only after having caused that image to appear on the screen by actuating the unit's operator. Further, the unit of this invention acts as a stimulus to a child's sense of color, and sense of coordination.

The self-contained projector and screen unit of this invention comprises, in preferred form, (a) a housing mounting a translucent screen on one side thereof, (b) a film strip having a series of image carrying frames enclosed within the housing, (c) a projection system, including a lens and light source, positioned inside of the housing and adapted to project the film strip's frames onto the screen, (d) a switch for selectively actuating the light source, (e) frame sequencing apparatus for selectively moving film frames one at a time in sequence through the projection system, and (f) a pull cord relating the frame sequencing apparatus to the switch and extending outside of the housing. As the cord is repeatedly pulled by a child the film strip frames are sequentially presented one at a time to the projection system; also, the light source is turned on only when the cord is pulled. Thus, the unit operates to project a different image onto the screen from the film strip each time and only when the cord is pulled.

The self-contained projector and screen unit of this invention has numerous advantages over similar prior art mechanisms that make the manufacture and use of this unit particularly adapted to the toy field. The mechanism is extremely tolerant to dimensional variations in the various components. It is relatively easy for the young child to advance one film frame after another onto the screen of the mechanism. The self-contained unit has only two moving parts, besides the moving film strip, thereby reducing maintenance problems to a minimum. Additionally, because the light source is on only when the unit is operated by a child the battery life of the toy is greatly extended.

Other objectives and advantages of the invention will be more apparent from the following detailed description taken in conjunction with the drawings in which:

FIG. 3 is a cross-sectional view taken along lines 3—3 of FIG. 2;

FIG. 4 is a cross-sectional view taken along lines 4—4 of FIG. 3 showing the frame sequencing apparatus in the initial or home position when the string is in the relaxed position;

FIG. 5 is a cross-sectional view taken along lines 5—5 of FIG. 3 showing the light source switch in the off position when the string is in the relaxed position.

Figure 1:
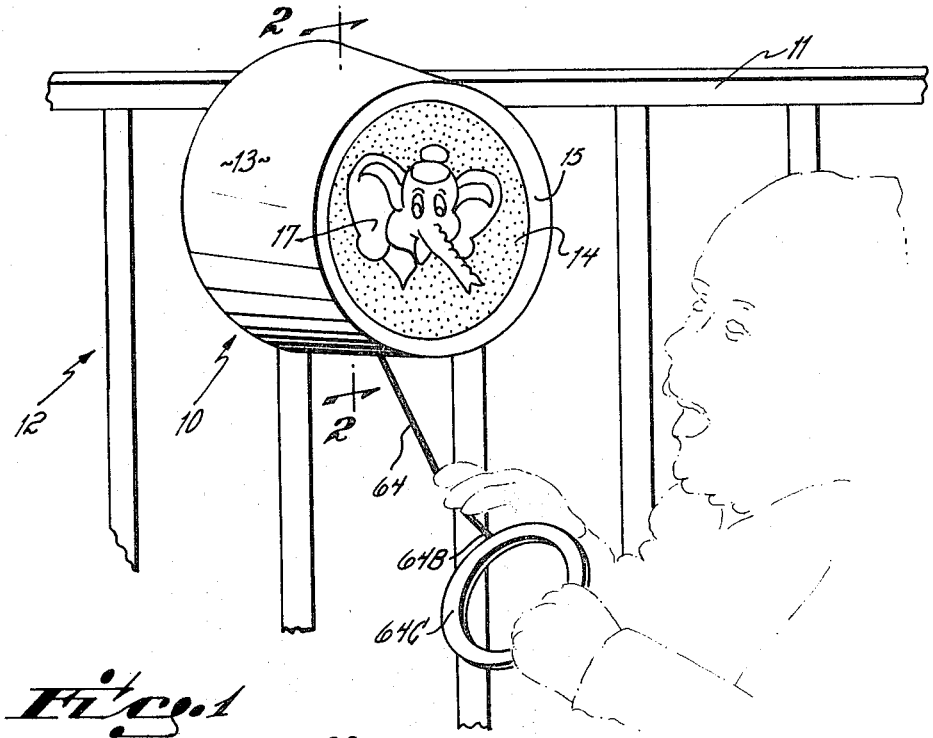
FIG. 1 illustrates the self-contained projector and screen unit of this invention in use as a crib toy with an image projected on the screen and the pull cord being in the extended or activated position.

As is illustrated in FIG. 1, the self-contained projector and screen unit 10 of this invention is particularly adapted for use as a crib type toy. The unit 10 can be attached to the top rail 11 of a crib 12 so that it can be easily reached and operated by a baby in the crib.

The self-contained projector and screen unit 10 includes a housing 13 of frusto-conical shape that is provided at the front end with a translucent screen 14. The screen 14 is held against an inwardly flared lip 15 molded integral with the housing 13 by a retainer ring 16, the screen edges being glued to the lip and the ring being glued to the screen edges and the lip. The screen 14 is provided to receive images 17 projected onto it by the projection system 18 so that the figure on any one frame of film strip 19 is visible to the baby in the crib 12. Because the screen 14 is translucent it not only receives the images 17, but it also prevents the unit's mechanical structure within the housing 13 from being seen by the eye.

The rear end of the housing 13 is provided with a circular door 21 which can be easily removed for access to the light source chamber 22 and battery 23 chamber inside of the housing. The door 21 mounts two inwardly formed lips 24 that cooperate with a circular flange 25 presented by the rear end of the housing to hold the door in place during use. The lips 24 are removed from cooperative engagement with the flange 25 by rotating the door 21 to a position where the lips mate with slots not shown, in the flange. A crib rail bracket 27 is mounted to a flat depression 28 provided toward the rear of the housing 13 and is mounted thereto by a screw 29 so that the entire unit 10 may be easily clamped onto the top rail 11 of a baby's crib 12, as is illustrated in FIG. 1.

The interior of the housing 13 is divided into three sections or chambers, namely, the light source chamber 22, the battery chamber 23, and a projection chamber 30. The light source chamber 22, as particularly illustrated in FIG. 2, includes the film strip 19 in the form of a closed loop. The closed loop film strip is provided with a series of individual picture frames, each carrying a different image, that are adapted to be sequentially projected onto the translucent screen. The closed loop strip 19 presents a series of advance holes 31 adjacent the top edge 32 thereof. The holes 31 are preferably spaced one from the other so that the distance between holes is equal to the width of a single frame on the film strip.

Frame sequencing apapratus 33 is provided to cooperate with the film strip holes 31 to selectively move the individual frames on the film strip one at a time, that is, in sequence, through the projector system 18. Each frame on the closed loop film strip is sequentially positioned by the frame sequencing apparatus to overlie an aperture 34 in dividing wall 35 that separates light source chamber 22 from the projection chamber 30 so the image on the frame is exposed to the projection system 18 and, hence, projected onto the translucent screen 14 as at 17, see FIG. 1. Each frame on the film strip 19, when it is disposed in projecting relation with the projection system 18, is maintained flush against the back of the dividing wall 35 by means of a track 36 having lips positioned at the top 37 and bottom 38 of the film strip. Thus, in that area of the projection system 18 where definite spatial relations must be maintained, successive frames of the closed loop film strip 19 are guided into a single or fixed position relative to the aperture 34 time after time by means of the track's lips 37, 38 and the frame sequencing apparatus 33.

The light source chamber 22 also includes a reflector 39 having a conical reflecting portion 39A and an annular retainer rib 40 attached to the flared end of the reflector. The circular retainer rim 40 cooperates with top and bottom catches 41, 42 molded integral with the dividing wall 35 so as to retain the reflector 39 in a fixed position relative to the aperture 34 in the dividing wall. A light bulb 43 is maintained in fixed relation with the reflector 39 by means of a bulb retainer 44 attachable to the reflector 39, the bulb retainer being easily removable in a conventional manner so as to permit simple replacement of the bulb without removing the reflector. The projection chamber 30 includes the lens 66 which is mounted in a tubular casing 67 molded integral wih the dividing wall 35 about the aperture 34. Of course, the distances of the lens 66 from the film strip 19 and the lens from the translucent screen 14 are such that adequate projection of the images on the film to the screen with suitable clarity is achieved.

The battery chamber 23 is positioned intermediate the light source chamber 22 and the projection chamber, and takes the form of a well having four side walls 45 and an end wall 46 sized to receive two batteries in series. The batteries are retained in the well by a spring clip 47 pivoted, as at 48, at one end to one side of the well and attachable at the other side of the well to a lip 49 molded integral with that side, see FIG. 2. The spring clip 47 bridges, as at 50, the bases of the two batteries 51a, 51b received in the battery well to provide a complete circuit at that point. The contact of one 51a of the batteries is directly grounded to the light bulb 43 by means of a first metal strap 52 extending from it to the light bulb, see FIGS. 2, 3 and 5. A second metal strap 53 is provided, at one end, adjacent but not touching the contact 54 of the second battery 51b and contacts the base of the light bulb 43 at the other end, see FIGS. 2, 3 and 5.

A switch 55 for selectively actuating the light bulb 43, that is, for completing the electrical circuit, is provided that is capable of bridging the gap between the end of the second metal strap 53 and the contact 54 of the second battery 51b, see FIGS. 3 and 5. The switch 55 is in the form of a flexible metal finger 56 connected, as at 57, to the metal strap 53. The finger 56 is selectively depressed into engagement with the knob 54 of the second battery 51b to complete the circuit. The finger 56 can be inwardly biased toward the contact 54b a non-conducting switch arm 58 made of a plastic material that is positioned in the projection chamber 30. The switch arm 58 is in the form of a fork-like frame 59 with the ends of the fork tines integrally connected to the dividing wall 35 through supports 60. The handle 61 of the fork 59 is provided with a thumb 62 for engaging the switch finger 56, and adjacent the outer end of the handle there is provided a bracket 63 through which a pull cord 64 passes. The switch finger 56 is caused to engage the battery contact 54 by pulling on the string 64, as is more fully explained below.

Figure 2:
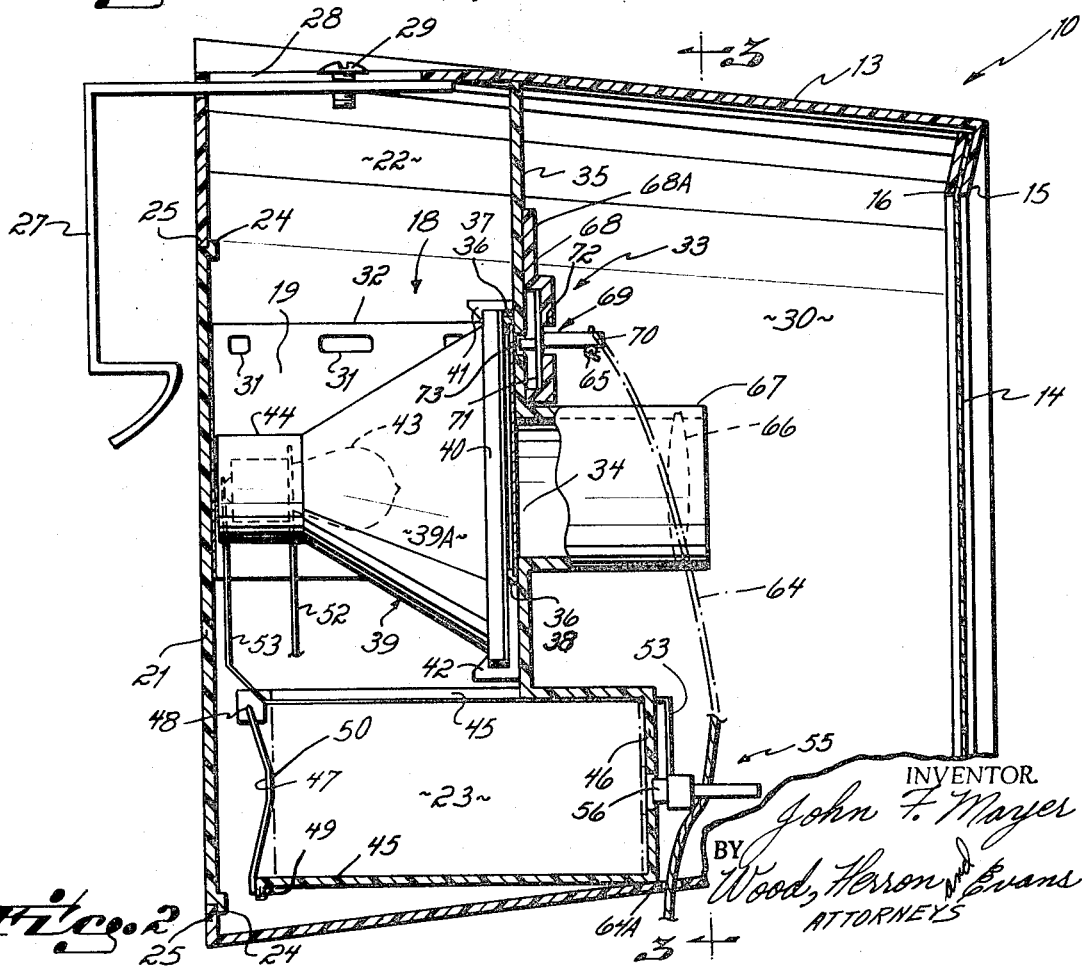
FIG. 2 is a cross-sectional view taken along lines 2—2 of FIG. 1 but with the string in the relaxed position.

As is illustrated particularly in FIGS. 1 and 2, the pull string 64 is connected at one end 65 to the frame sequencing apparatus 33, this apparaatus being generally positioned in a vertical plane that is substantially the same plane as that in which the dividing wall 35 lies. The pull string 64 is threaded from the frame sequencing apparatus 33 through the bracket 63 of the switch 55, the vertical plane in which the switch resides being substantially removed from and in front of the vertical plane in which the frame sequencing apparatus resides. From the switch 55 the pull string 64 is threaded through a hole 64a in the bottom of the housing 13 that is positioned substantially in the same vertical plane as and below the switch 55. The outside end 64b of the pull string 64 is attached to a pull ring 64c that can be grasped and pulled by a child. By pulling down on the string 64 the switch arm 58 and, hence, the switch finger 56, are biased inwardly to cause the switch finger to engage the contact 54 and, thereby, complete the circuit that illuminates the light bulb 43 in the projection system 18. Thus, for the reason that by pulling the string 64 taut, the string attempts to form a straight line between end 65 and hole 64a and, in the process of attempting to form that straight line, it biases the switch finger 56 into contact with battery 51b. Hence, the light 43 in the projection system 18 is on only when the pull string 64 is pulled taut because the switch finger 56 is normally biased away from the battery 51b, see FIG. 5, and is actuated only by pulling the pull cord.

The film sequencing apparatus 33, located in the projection chamber 30, includes an advance guide plate 68a positively mounted to the dividing wall 35, the guide plate defining a trackway 68 within which a film sequencer 69 is adapted to oscillate back and forth. The film sequencer 69, as is illustrated in FIG. 4, includes a plate 70 on which an advance arm 71 is integrally mounted, the plate 70 extending up out of the guide plate 68a through a slot 72 therein. The forward end of the advance arm 71 carries on its under side a detent 73 adapted to engage the spaced holes 31 in the film strip 19. The plate 70, at its exposed top, is connected, as at 74, to a return spring 75 that is connected to a fixed post 76. The other end of the plate 70 is connected, as at 65, to the pull string 64. The pull string 64 is threaded through an eye 77 in the guide plate 68a at a position beyond the limit of forward movement of the advance arm 71 and, from that point, is threaded down through the bracket 63 molded integral with the switch arm 58. Thus, when the pull string 64 is pulled by grasping the ring 64c the force exerted on the advance arm 71 at the string end 65 will cause the advance arm to move substantially perpendicular to the downward movement of the string, see FIG. 3.

The arm 71 and, hence, the detent 73 are adapted to move from a first position illustrated in FIG. 4 where the back edge of the plate is abutted up against rear limit stop 80 to a forward position where the detent and plate abut against a forward limit stop 81 defined by the dividing wall. Thus, the distance the detent 73 is permitted to travel by pulling the string 64 is exactly that distance required for moving the closed loop film strip 19 one frame length. The projection system 18 will be actuated to project the frame's image onto screen 14 only when the string is taut, that is, when the detent 73 abuts the forward limit stop 81, because it is only at that point when sufficient force is created to bias the switch finger 56 against the battery 51*b*.

Because the return spring 75 is connected to the advance arm substantially above the plane of the film strip's linear movement through the projection system 18, and because the other end of the return spring is connected to the fixed post 76 at a point substantially in the plane of the film strip's linear movement through the projection system, the detent 73 is biased up out of engagement with the film strip at all times when the pull string 64 is not being pulled, see FIG. 4. That is, the detent 73 is not only biased up out of engagement with the film strip 19 when the projection system is not "on," as illustrated in FIG. 4, but it is also biased up out of engagement with the film strip 19 in the return portion of its cycle after it has abutted the forward limit stop 81 and is returning to home position. This prevents the detent from rubbing over the film strip on the return half of its cycle and makes the direction of movement of the film strip through the projection system 18 a unidirectional one. Because the pull string 64 is also attached to the plate 70 at a point 65 substantially above the plane of the film strip's linear movement through the projection system, and because the pull string is forced to follow a slanting path toward the plane of the film strip's linear movement through the projection system until it passes through the eyelet 77, when the pull string is pulled it will cause the detent 73 to pivot downwardly toward the hole 31 in the film strip 19 and engage that hole to move the film strip 19 one frame length on the forward half of its cycle until the detent abuts forward limit stop 81. Thus, by means of this frame sequencing apparatus 33 it will be apparent that the film strip can be advanced in one direction only.

In operation, it will be apparent to those skilled in the art that the only two moving components of the unit 10, aside from the closed loop film strip 19 and the string 64, are the advance arm 71 and the switch 55. That is, no pawls, gears, cams, or other relatively complicated mechanical structure is required for sequentially advancing the film strip one frame at a time. Normally the pull cord 64 is in a relaxed position, see FIGS. 2–5, at which time no image 17 is being projected onto the screen 14. When the pull string 64 is pulled by a baby by holding onto the ring 64*c* the advance arm 71 is caused to reciprocate toward the forward limit stop 81 and the detent 73 is biased down into engagement with a hole 31 in the film strip 19 so that as the arm 71 advances the film frame in the projection system is changed. When the detent 73 abuts step 81 it will be apparent that because the switch 55 is in a vertical plane substantially in front of the frame sequencing mechanism 33, and because the pull string is attached at one end to the frame sequencing mechanism, the switch arm 58 biases the switch finger 56 into contact with the battery 51*b* to complete the battery circuit and illuminate the light bulb 43, thereby projecting the film strip's image 17 onto the screen 14, see FIG. 1.

Having completely described the preferred embodiment of my invention, what I desire to claim and protect by Letters Patent is:

1. A self-contained projector and screen unit comprising:
    a housing mounting a translucent screen on one side thereof,
    a projection system, including a lens and a light source, positioned inside of said housing,
    a series of image carrying film frames provided for said projection system, said film frames being projectable onto said screen by said projection system,
    a switch for selectively actuating said light source,
    frame sequencing apparatus for selectively moving said film frames one at a time in sequence through said projection system, said frame sequencing apparatus including a film sequencer adapted to oscillate back and forth for moving said film frames through said projection system, and
    a pull cord extending from said frame sequencing apparatus to the outside of said housing so that as said cord is repeatedly pulled by an operator said film frames are sequentially presented one at a time to said projection system, said pull cord being connected to one end of said sequencer for moving it in one of a forward and a return direction and a spring being connected to the other end of said sequencer for constantly biasing it in the other of the forward and the return direction.

2. A self-contained projector and screen unit as defined in claim 1 wherein said pull cord is additionally related to said switch so that said light source is actuated only when said cord is pulled.

3. A self-contained projector and screen unit as set forth in claim 1 wherein said film frames are in the form of a closed loop film strip.

4. A self-contained projector and screen unit as set forth in claim 1 wherein said sequencer oscillates back and forth within a guide plate that defines a trackway for said sequencer, said sequencer cooperating with holes adjacent said film frames.

5. A self-contained projector and screen unit as set forth in claim 4 wherein said sequencer includes:
    an advance arm guided for oscillatory movement within said trackway, one end of said advance arm carrying a detent adapted to engage said holes in said film frames for advancing said film frames one frame at a time.

6. A self-contained projector and screen unit as set forth in claim 5 wherein said sequencer further includes:
    a plate mounted to said advance arm that extends up out of said guide plate through a slot, said pull cord being connected to said plate at a point in a plane parallel to but substantially removed from the plane of the film frames' linear movement through the projection system.

7. A self-contained projector and screen unit as set forth in claim 6 wherein said pull cord is threaded through an eye positioned in substantially the same plane as the plane of the film frames' linear movement through the projection system, wherein one end of said spring is connected to said plate at a point in a plane parallel to but substantially removed from the plane of the film frames' linear movement through the projection system, and wherein the other end of said spring is connected to a fixed point positioned in substantially the same plane as the plane of film frames' linear movement through the projection system.

8. A self-contained projector and screen unit as set forth in claim 2 wherein said switch includes:
    a switch finger normally biased out of engagement with a circuit contact to maintain the circuit normally in an uncompleted attitude, and
    flexible guide means associated with said switch finger through which said pull cord is threaded and adapted to engage said switch finger, said flexible guide means biasing said switch finger into electrical contact with its associated circuit contact as said pull cord is pulled by an operator.

9. A self-contained projector and screen unit as set forth in claim 8 including:
    an aperture in the housing through which said pull cord extends to the outside, said aperture being positioned so that as said pull cord is pulled and drawn taut by an operator between that point where it is connected to said frame sequencing apparatus and that point where it extends outside of said housing said switch finger is biased into electrical contact with its associated circuit contact.

References Cited

UNITED STATES PATENTS

| | | | | |
|---|---|---|---|---|
| 2,616,332 | 11/1952 | Sorkin | | 353—43 |
| 3,124,039 | 3/1964 | Anderson | | 353—95 |

FOREIGN PATENTS

| | | | | |
|---|---|---|---|---|
| 833,147 | 7/1938 | France | | 353—74 |
| 479,749 | 7/1929 | Germany | | 353—95 |
| 239,568 | 2/1946 | Switzerland | | 353—74 |

HARRY N. HAROIAN, Primary Examiner

U.S. Cl. X.R.

353—43, 74